United States Patent Office 3,457,180
Patented July 22, 1969

3,457,180
PLASTIC SCINTILLATOR
Robert Kretz and Ludwig Hosch, Darmstadt, Germany, assignors to Rohm & Haas G.m.b.H., Darmstadt, Germany
No Drawing. Filed June 14, 1967, Ser. No. 645,886
Claims priority, application Germany, July 16, 1966, R 43,712
Int. Cl. C09k 1/02; C08f 29/34
U.S. Cl. 252—301.2                2 Claims

ABSTRACT OF THE DISCLOSURE

Scintillators comprising known scintillating substances in a resin matrix of a copolymer of p-vinyl toluene and methyl methacrylate in a weight ratio of 50:50 to 80:20.

---

The present invention relates to plastic scintillators, i.e. to scintillators comprising a synthetic polymeric resin, and to methods for making the same.

It is known in the art that plastic scintillators can be prepared by dissolving scintillating substances in aromatic vinyl compounds, optionally together with so-called wave-length shifters, and then polymerizing the mixture to form films, sheets, or blocks. Suitable aromatic vinyl compounds include, for example, styrene, p-vinyl toluene, vinyl xylene, p-vinyl diphenyl, and vinyl napthalene.

The use of polystyrene as a solid solvent for scintillating substances such as antharcene, stilbene, p-terphenyl, and the like gives scintillators which are unsatisfactory from the viewpoint of the constancy of their relative pulse height. On the other hand, the aromatic vinyl compounds, which are satisfactory from the viewpoint of relative pulse height, all polymerize slowly and scintillators can be prepared from these compounds only with difficulty. Further, solid polymers of the aromatic vinyl compounds have a high susceptibility to cracking and are difficult to work because of their mechanical properties. Polymers such as polymethyl methacrylate which have more satisfactory mechanical properties, inherent color, resistance to weathering, and ease of preparation are not useful because the count yields attainable with scintillators prepared from such polymers is completely unsatisfactory. The only available plastic scintillators are those whose synthetic component is essentially a homopolymer of an aromatic vinyl compound. This fact reflects the opinion of those skilled in the art that other plastics which would be more advantageous from the viewpoint of their preparation and mechanical properties cannot be used for preparing scintillators.

According to the present invention, it has been found that plastic scintillators having practically the same relative pulse heights as those of polyvinyl-toluene scintillators, but which are far superior from the viewpoint of their ease of preparation mechanical properties, and aging properties, can be prepared by the copolymerization of p-vinyl toluene and methyl methacrylate in a ratio by weight of from 50:50 to 80:20.

As known in the art, monomers of this type are suitably copolymerized in the presence of a free-radical activator, including azo compounds such as azo-bis(isobutyronitrile), peroxides such as lauryl peroxide or benzoyl peroxide, other per compounds such as t-butyl peroctoate or t-butyl perpivalate, or their equivalents.

For the preparation of scintillators, the monomers are copolymerized in the presence of one or more organic scintillating substances, dissolved in the monomer mixture, of a type known in the art. Useful materials include, for example, 2,5-diphenyl-oxazole,
p-terphenyl,
2-phenyl-5-(4'-biphenylyl)-1,3,4-oxadiazole,
2,5-di-(4'-biphenylyl)-oxazole,
2,5-(2',5'-dibromophenyl)-1,3,4-oxadiazole,
2-cyclohexyl-5-phenyl-oxazole,
2-(1'-naphthyl)-5-phenyl-oxazole,
2-(2'-fluorenyl)-5-(1''-naphthyl)-oxazole,
1,1,4,4-tetraphenylbutadiene,
2,5-[5'-tert. butyl-benzoxazolyl-(2')]-thiophene,
4,4'''-bis(2-butyloctyloxy)-p-quaterphenyl,
4,4'-bis(n-octyloxy)-1,1'-dinaphthyl,
2,5-diphenyl-1,3,4-oxadiazole,
5-phenyl-2-(p-methoxyphenyl)-1,3,4-oxadiazole.

One or more monomer-soluble wave-length shifters may also be incorporated into the plastic scintillators of the invention. Again, these substances are organic materials known in the are and used in the art in other scintillating devices. Typical useful materials include 1,4-bis[5'-phenyl-oxazolyl-(2')]-benzene,
1,4-bis[4'-methyl-5'-phenyl-oxazolyl-(2')]-benzene,
4,4'-diphenylstilbene,
1,6-diphenylhexatriene,
1,1',4,4',-tetraphenylbutadiene,
1,4-bis[5'-naphthyl-(2'')-oxazolyl-(2')]-benzene,
2-(4'-biphenylyl)-6-phenyl-benzoxazole,
bis-(o-methylstyryl)benzene,
2-naphthyl-(1')-5-phenyl-oxazole,
diethylamino-4-methyl-cumarin.

The scintillators and wave-length shifters are incorporated into the devices of the invention in amounts and in combinations conventional in the art and dependent on specific properties desired in the product.

The copolymerization proceeds with the exclusion of oxygen to prevent yellowing of the plastic matrix. The mixtures are preferably copolymerized until little unreacted monomer, suitably less than about 1 percent by weight, is left. This minimizes quenching by unreacted monomer in the final product. Tempering the polymer product at a temperature of about 100°–110° C. is useful in promoting complete polymerization. Tempering times are variable depending on the thickness of the polymer body and may range from a few hours to a day or more. Glass-clear transparent bodies are obtained.

Scintillators prepared according to the process of the present invention are adaptable to the detection of X-rays and $\alpha$-, $\beta$-, gamma, and fast neutron radiation. Irradiation with a source such as cesium 137 produces scintillations of high intensity, quite to the contrary of the expectation that scintillators whose plastic component comprised any substantial portion of a monomer other than an aromatic vinyl monomer would give particularly poor relative pulse heights with such radiation.

A better understanding of the present invention and of its many advantages will be had from the following example, given by way of illustration.

Example 100 grams of methyl methacrylate and 100 grams of vinyl toluene were mixed in a glass mold and purged of air with carbon dioxide and nitrogen. 4 grams of 2-phenyl-5-(4'-biphenylyl)-1,3,4-oxadiazole, 0.1 gram of 1,4-bis[5'-phenyl-oxazolyl-(2')]-benzene, and 0.1 gram of azo-bis(isobutyronitrile) were added. The mixture was purged again with nitrogen.

The container was well sealed and the contents polymerized in a water bath at 40° C. After 100 hours, the temperature was raised to 50° C. and then tempered an additional 24 hours at 100° C.

The relative pulse height, measured on samples of identical geometry without a reflector by means of an RCA-6655 secondary electron multiplier and a Cs-137 radiation source, was 96 percent in comparison with a commercially available scintillator whose count yield was taken as 100 percent. The value of 96 percent is on average value from six measurements. The 4 percent difference, as will be evident to one skilled in the art, is within the limits of experimental error.

The polymerization technique described in this example can be advantageously modified by first polymerizing a major portion of the monomer mixture, with exclusion of oxygen, until a copolymer of syrupy consistency is obtained. The organic scintillator and wave-length shifter (if any) are then added dissolved in a portion of the monomer mixture and polymerization is completed in the absence of oxygen.

What is claimed is:

1. A plastic scintillator consisting essentially of an organic scintillating substance dissolved in a solid matrix of a copolymer of vinyl toluene and methyl methacrylate in which the ratio by weight of vinyl toluene to methyl methacrylate is from about 50:50 to about 80:20, and wherein less than 1 percent by weight of residual unpolymerized monomer is present in said matrix.

2. A plastic scintillator as in claim 1 wherein a wavelength shifter is additionally present in said matrix.

References Cited
UNITED STATES PATENTS

| | | | |
|---|---|---|---|
| 3,041,287 | 6/1962 | Hyman | 252—301.2 |
| 3,214,382 | 10/1965 | Windsor | 252—301.2 |

JOSEPH L. SCHOFER, Primary Examiner

J. C. HAIGHT, Assistant Examiner

U.S. Cl. X.R.

250—71.5; 260—86.7